United States Patent [19]

Morris

[11] Patent Number: 4,886,586

[45] Date of Patent: Dec. 12, 1989

[54] COMBINATION ELECTROLYSIS CELL SEAL MEMBER AND MEMBRANE TENTERING MEANS FOR A FILTER PRESS TYPE ELECTROLYTIC CELL

[75] Inventor: Gregory J. E. Morris, Milan, Italy

[73] Assignee: The Dow Chemical Company, Midland, Mich.

[21] Appl. No.: 249,140

[22] Filed: Sep. 26, 1988

[51] Int. Cl.$^4$ .......................... C25B 1/26; C25B 9/00; C25B 13/02

[52] U.S. Cl. .................... 204/128; 204/253; 204/254; 204/256; 204/258; 204/279

[58] Field of Search ........................ 204/279, 252–266, 204/98, 128

[56] References Cited

U.S. PATENT DOCUMENTS

| | | | |
|---|---|---|---|
| 1,721,407 | 7/1929 | Pechkranz | 204/254 |
| 2,306,160 | 12/1942 | Freyssinet | 277/34.3 |
| 3,378,480 | 4/1968 | Reishagen et al. | 204/253 |
| 3,857,773 | 12/1974 | DuBois et al. | 204/253 |
| 3,869,375 | 3/1975 | Ono et al. | 204/256 X |
| 3,964,932 | 6/1976 | Oltman et al. | 429/185 |
| 4,013,535 | 3/1977 | White | 204/252 |
| 4,026,782 | 5/1977 | Bouy et al. | 204/254 |
| 4,076,609 | 2/1978 | Mas | 204/258 |
| 4,098,670 | 7/1978 | Custer et al. | 204/252 |
| 4,107,023 | 8/1978 | Mentz | 204/269 |
| 4,111,779 | 9/1978 | Seko et al. | 204/255 |
| 4,137,144 | 1/1979 | Kenney | 204/268 |
| 4,139,448 | 2/1979 | Wallace | 204/256 |
| 4,175,024 | 11/1979 | Darlington | 204/252 |
| 4,175,025 | 11/1979 | Creamer et al. | 204/253 |
| 4,188,464 | 2/1980 | Adams et al. | 429/210 |
| 4,191,627 | 3/1980 | Specht | 204/296 |
| 4,197,206 | 4/1980 | Karn | 204/253 X |
| 4,207,165 | 6/1980 | Mose et al. | 204/258 |
| 4,217,200 | 8/1980 | Kedem et al. | 204/301 |
| 4,219,394 | 8/1980 | Bobinksy et al. | 204/98 |
| 4,253,932 | 3/1981 | Mose et al. | 204/253 |
| 4,268,372 | 5/1981 | Iizima et al. | 204/252 |
| 4,268,373 | 5/1981 | Iizima et al. | 204/252 |
| 4,274,928 | 6/1981 | Cunningham | 204/98 |
| 4,279,731 | 7/1981 | Pellegri | 204/254 |
| 4,313,812 | 2/1982 | Kircher | 204/253 |
| 4,332,661 | 6/1982 | Ford et al. | 204/253 |
| 4,342,460 | 8/1982 | Eng | 204/279 X |
| 4,344,633 | 8/1982 | Niksa | 204/279 X |

(List continued on next page.)

FOREIGN PATENT DOCUMENTS

| | | |
|---|---|---|
| 0051380 | 5/1982 | European Pat. Off. . |
| 0080288 | 11/1982 | European Pat. Off. . |
| 0118973 | 1/1984 | European Pat. Off. . |
| 2821983 | 11/1979 | Fed. Rep. of Germany . |
| 53-63284 | 6/1978 | Japan . |
| 53-146272 | 12/1978 | Japan . |
| 56-38484 | 4/1981 | Japan . |
| 58-4926 | 1/1983 | Japan . |
| 58-35272 | 8/1983 | Japan . |
| 1082867 | 3/1984 | U.S.S.R. . |
| 1078129 | 12/1964 | United Kingdom . |
| 1192245 | 5/1970 | United Kingdom . |
| 2013242 | 8/1979 | United Kingdom . |

Primary Examiner—Donald R. Valentine

[57] ABSTRACT

A combination seal and tentering member suitable for use as a gasket in an electrolytic cell of the filter press type and suitable for tentering a membrane used in the electrolytic cell. The seal/tentering member used in the filter press type electrolytic cell includes a first portion generally rectangular in cross section, having parallel top and bottom walls and first and second vertical parallel side walls, and a second flange portion integral with the first portion generally rectangular in cross section having a top and bottom wall and first and second parallel side walls, said second portion having top and bottom walls of a smaller length such that the seal/tentering member forms a "P-shaped" parameter viewed in cross section, said bottom of first portion and top of second portion being a contiguous boundary and said first side wall of said second portion and said first side wall of said first portion is substantially the same wall. Aqueous alkali metal chloride solution may be electrolyzed in the electrolytic cell.

13 Claims, 2 Drawing Sheets

U.S. PATENT DOCUMENTS

| | | | |
|---|---|---|---|
| 4,381,984 | 5/1983 | Kircher | 204/258 |
| 4,390,408 | 6/1983 | Kircher | 204/284 |
| 4,431,502 | 2/1984 | Ford | 204/252 |
| 4,441,977 | 4/1984 | Ford | 204/252 |
| 4,455,209 | 6/1984 | Hermann | 204/279 |
| 4,470,608 | 9/1984 | Warren | 277/164 |
| 4,488,946 | 12/1984 | Morris et al. | 204/98 |
| 4,490,231 | 12/1984 | Boulton | 204/263 |
| 4,493,759 | 1/1985 | Boulton et al. | 204/252 |
| 4,585,527 | 4/1986 | Northway et al. | 204/98 X |
| 4,604,331 | 8/1986 | Louis | 429/35 |
| 4,610,765 | 9/1986 | Beaver et al. | 204/128 |
| 4,623,599 | 11/1986 | Vourlis | 429/174 |
| 4,638,109 | 1/1983 | Ford | 136/244 |
| 4,648,953 | 3/1987 | Wardle et al. | 204/255 X |
| 4,654,134 | 3/1987 | Morris et al. | 204/252 |
| 4,656,104 | 4/1987 | Tucholski | 429/185 |
| 4,721,555 | 1/1988 | Grosshandler | 204/252 |
| 4,738,905 | 4/1988 | Collins | 429/36 |
| 4,748,092 | 5/1988 | Hekal | 429/35 |
| 4,770,756 | 9/1988 | Cawlfield et al. | 204/279 X |

COMBINATION ELECTROLYSIS CELL SEAL MEMBER AND MEMBRANE TENTERING MEANS FOR A FILTER PRESS TYPE ELECTROLYTIC CELL

BACKGROUND OF THE INVENTION

This invention relates to a combination electrolysis cell sealing means and separator tentering means for a filter press type electrolytic cell, and more particularly, to a combination electrolytic cell gasket member and separator tentering device for use in filter press type electrolytic cells.

Electrolytic cells of the filter press-type are known to be used for the electrolysis of aqueous salt solutions and have been commercially employed for the production of chlorine and caustic from brine. The filter press type electrolytic cell for electrolysis of an aqueous salt solution commonly employ a plurality of frame members with electrodes held thereto and assembled in a filter press type arrangement, separated from each other by membranes, diaphragms or microporous separators, forming a plurality of anolyte and catholyte compartments. The electrodes used in the cells are generally either monopolar or bipolar electrodes.

Membranes typically used in the cells are generally available in sheet form and have ion exchange properties, for example, membrane materials employed in the cells are such as those marketed by E. I. duPont de Nemours and Company under the trademark Nafion ® and by Asahi Glass Company Ltd. under the trademark Flemion ®.

Typically, a press means is used to compress or clamp together the separators in sheet form between the sides of the frame members of the filter press cell and electrolyte is used to fill the compartments of the cell. To provide a fluid-tight seal between the frame members and the separator without damaging the separator, the electrolytic cells employ substantially flat, solid gaskets having a rectangular cross-sectional area or tubular type gaskets having a circular cross-sectional area made of elastomeric material. One or two gaskets can be used to fit between the cell frame members on a peripheral flange portion of the frame members and on either side of the membrane. While most gaskets, for the most part, can provide a liquid-tight seal, the seal is generally not completely fluid-tight, i.e. liquid and gas-tight. To some extent fluid and gas seepage occurs at the interface formed between the membrane contacting the gasket members.

The problem of fluid seepage occurs particularly in cells which employ membrane separators that utilize a support or reinforcement material in the membrane. This reinforcement material is usually used because it provides the normally weak membrane with additional strength for handling and installing into industrial size membrane filter press electrolytic cells. The problem associated with the use of support or reinforcements in membranes is it allows gases and liquids to seep from the inside of the operating cell to the exterior. This seepage can cause severe damage to the outer surface of the cell peripheral surface. Fluid seepage can also expose operating personnel to potentially hazardous chemicals. The problem of fluid seepage is aggravated by the use of pressurized cells operating under an internal electrode compartment pressure. The contemporary compression-seal means now being used by industry cannot significantly block the leakage of the liquids and gases in the electrolytic cells.

Another problem associated with the use of conventional gasketing of filter press cells is membrane drying. In a conventional membrane filter press type cell operation, the membrane is usually extended past the periphery of the cell and exposed to the environment. This exposure, in time, allows the membrane to dry and possibly crack. Any cracks formed in the exposed surface of the membrane can propagate, during operation of the cell, through the membrane to the portion of the membrane which is inside the cell, i.e., the operating area of the membrane, which in turn, can cause severe operation problems such as mixing of electrolytes, that can cause corrosion of the cell's components and mixture of gases which can lead to explosions. Each situation can lead to the termination of the cell operation.

Still another problem associated with the assembly of filter press cells is, in addition to conventional gasketing, a separate and independent tentering device is normally needed to planarly dispose the membrane between the frame members of the cell. One conventional method of tentering the membrane involves personnel holding the membrane by hand between cell frames and stretching the membrane as the cell frames are compressed together. The cell gaskets, in this instance, are glued or taped to one of the electrode frames. In another method, the cell frames, membranes and gaskets are assembled in the horizontal position to ensure a planar placement of the membrane and gaskets, and thereafter standing the assembled cell in the upright position for operation. In still another method, the membrane and gasket are glued or taped to the cathode or anode frame prior to assembling the elements of the cell together. These approaches are unsatisfactory as they present time consuming, complex procedures, costly equipment and safety hazards to personnel. These procedures may also allow the membrane to dry and crack and thereby render it unfit for operation.

It is, therefore, desired to provide a means suitable for sealing an electrolytic cell and tentering an electrolytic cell separator to reduce the complexity of assembling the elements of an electrolytic cell.

It is further desired to provide a solution to the other problems discussed above by providing a device and method for insuring that the outer boundaries of a membrane stay in a moist or wet state and by providing a device and method for containment and/or control of gas and liquid seepage from the internal cell structure at the membrane/gasket interface of a membrane filter press type cell.

SUMMARY OF THE INVENTION

One aspect of the present invention is a combination sealing means and tentering means suitable for use in an electrolytic cell of the filter press type. The sealing and tentering means for a filter press type electrolytic cell includes a first portion generally rectangular in cross section, having parallel top and bottom walls and first and second vertical parallel side walls, and a second flange portion integral with the first portion generally rectangular in cross section having a top and bottom wall and first and second parallel side walls, said second portion having top and bottom walls of a smaller length such that the gasket member forms a P-shape parameter viewed in cross section said bottom of first portion and top of second portion being a contiguous boundary and said first side wall of said second portion and said first side wall of said first portion is substantially the same wall. Aqueous alkali metal chloride solution may be electrolyzed in the electrolytic cell.

Another aspect of the invention is a method of sealing an electrolytic cell and tentering a membrane member in the cell using the combination seal and tentering means above.

DETAILED DESCRIPTION OF THE PREFERRED EMBODIMENTS

Figure 1:
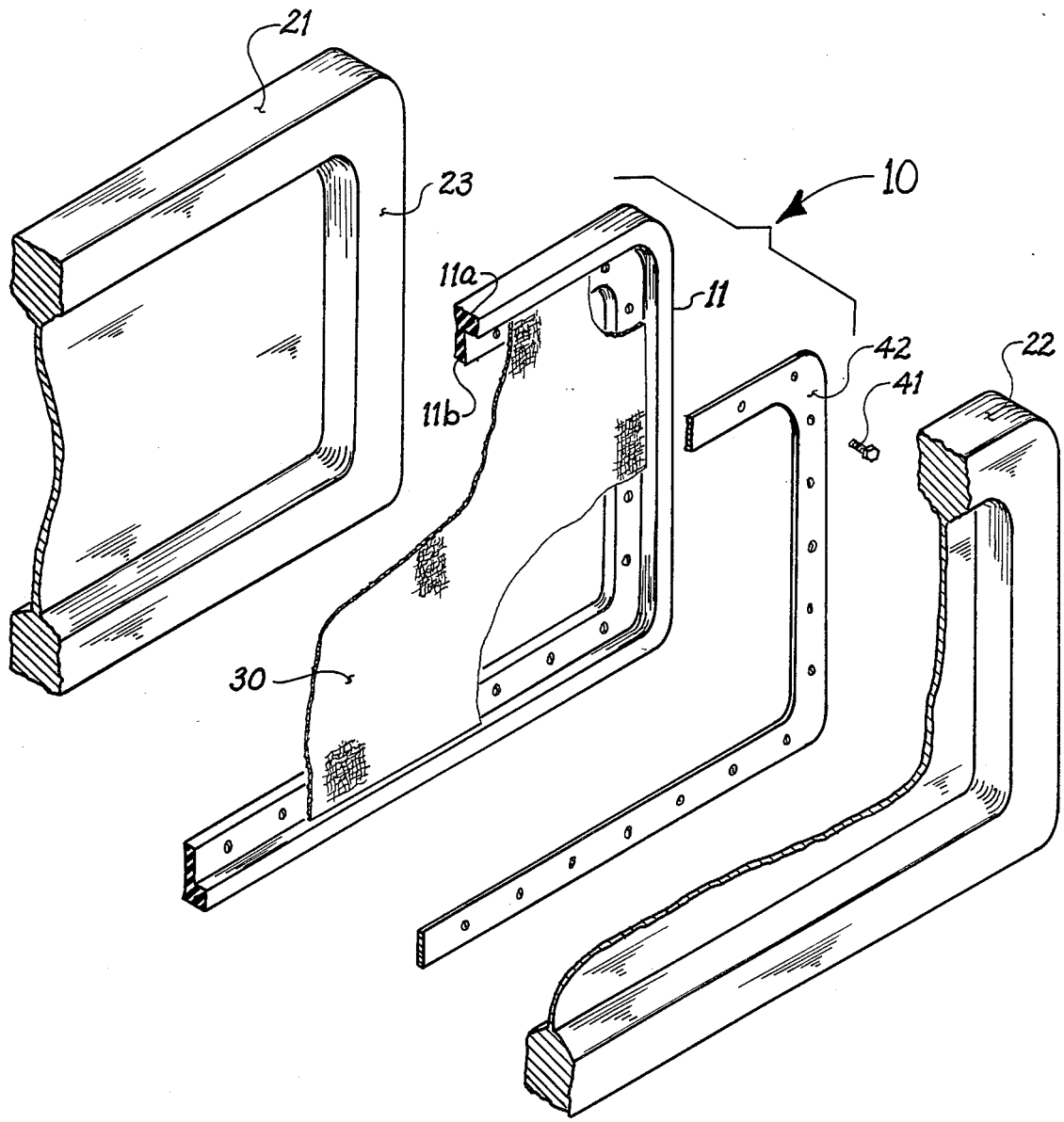
FIG. 1 is a partially exploded, partially broken away perspective view of an electrolysis cell assembly showing one embodiment of a seal and tentering member of the present invention with a membrane between two electrolysis cell frame members.
Figure 2:
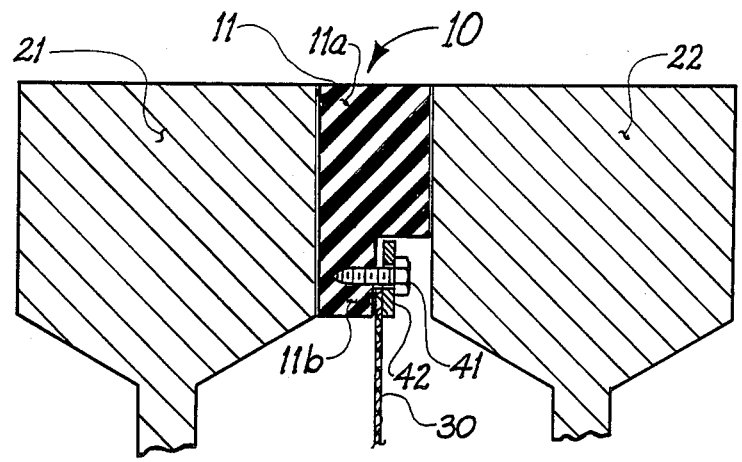
FIG. 2 is a cross-sectional view of the elements of FIG. 1 compressed together.
Figure 3:
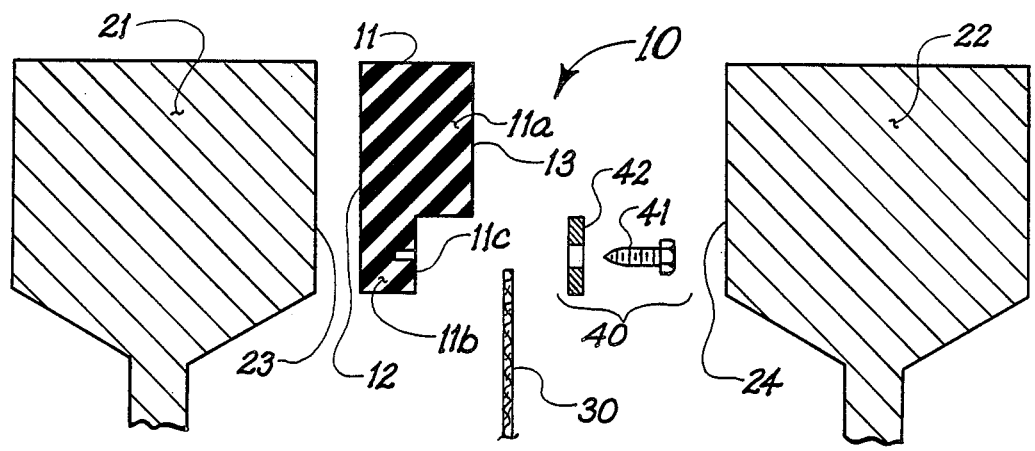
FIG. 3 is an exploded view of FIG. 2.

With reference to FIGS. 1, 2 and 3, there is shown a combination sealing and tentering member, generally indicated by numeral 10, interposed between two cell frame members 21 and 22. The combination sealing and tentering member (herein referred to as the seal/tentering member 10) comprises a solid body structure 11 in a picture frame type configuration. The solid body further comprises a first generally rectangular portion 11a integral with a second generally rectangular flange portion 11b of a size smaller than the first portion forming a "P-shaped" member when viewed in cross section. The first portion 11a is adapted for providing a seal between the flange material face 23 and 24 at the two planar frame members 21 and 22, respectively. The second flange portion 11b is adapted for tentering a separator or membrane member 30 thereon.

The first portion 11a generally rectangular in cross section, has parallel top and bottom walls and first and second vertical parallel side walls, and the second flange portion is integral with the first portion. The second portion is also generally rectangular in cross section and has a top and bottom wall and first and second parallel side walls, however the second portion has top and bottom walls of a smaller length than the first portion such that the seal/tentering member has a P-shape parameter viewed in cross section. The bottom of the first portion and top of second portion form a contiguous boundary and the first side wall of the second portion and the first side wall of the first portion is substantially the same wall. The second sidewall of the second portion is adapted for tentering a separator.

As aforementioned, the seal/tentering member 10 when viewed in cross section has a "P-shaped" configuration. The flange member 11b of the P-shaped member is sized sufficient to hold at least a portion of the periphery or edges of a membrane member 30 on the solid body structure 11, before installation into a cell assembly. The second sidewall 11c of the flange portion 11b contacts the peripheral edge of the membrane 30. A releaseably fastening means 40 is used to secure the membrane 30 to the second flange portion 11b. The fastening means 40 can be, for example, a plurality of screw means 41 and a flat plate member 42 in a picture type configuration. The edge of the membrane may cover a portion of the sidewall 11c shown in FIG. 3 or may extend over the entire surface of sidewall 11c. If the membrane edge covers the entire surface of sidewall 11c, openings (not shown) in the membrane may be needed for passing the screw means 41 therethrough.

The seal/tentering member 10 is interposed between the flange material face 23 and 24 of the frame members 21 and 22, respectively. The surface 12 of the seal/tentering member 10 contacts the surface 23 of the flange member 21 and the surface 13, of the first portion surface of 11a contacts the surface 24 of the flange member 22.

Figure 4:
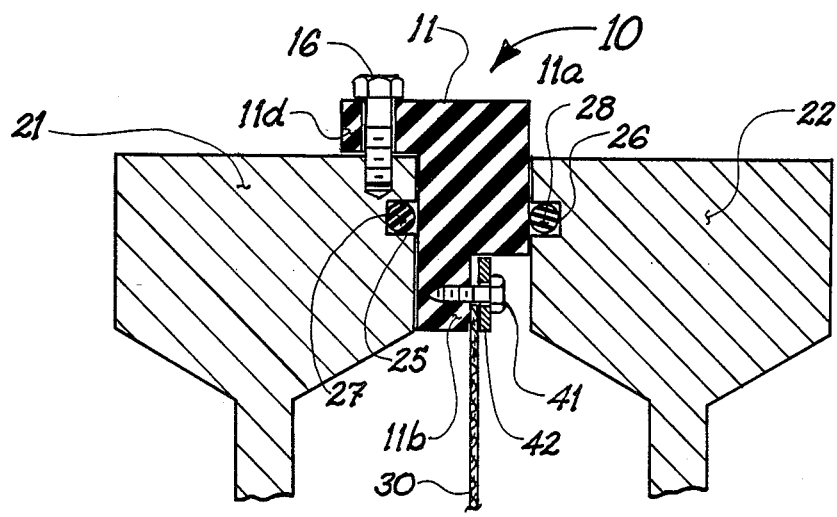
FIG. 4 is a cross-sectional view of an electrolysis cell assembly showing another embodiment of the sealing and tentering member of the present invention with a membrane between two electrolysis cell frame members.

With reference to FIG. 4, there is shown another embodiment of the seal/tentering member 10. In FIG. 4, the solid body member 11 contains a second flange portion 11d extending a predetermined distance on the outer surfaces of frame member 21. Optionally, at least one and preferably, a plurality of fastening members 16 can be used to attach the seal/tentering member 10 to the frame member 21 as shown in FIG. 4 or alternatively to the frame member 22 (not shown). The frame members 21 and 22 may have recesses or grooves 25 and 26, respectively, with O-ring type seal members 27 and 28, respectively, for further sealing the interface between the seal/tentering member 10 and frame members 21 and 22. Optionally, the seal/tentering member 10 may have a groove on surface 12 and a seal member such as an "O-ring" disposed within the groove for further sealing the interface between the seal/tentering member 10 and surface 23 of frame 21 (not shown). The groove and seal member can also be used on the second sidewall surface 13 of the first portion 11a of the member 10 for further sealing the interface between the surface 24 of frame member 22 and second sidewall surface 13 of the first portion 11a (not shown). The aforementioned grooves and seal members may also be used in conjunction with embodiments shown in FIGS. 1-3.

The seal/tentering member of the present invention should be made of an electrically insulating material. It is desirable that the seal/tentering member be flexible, and preferably resilient, in order to aid in achieving leak-tight seals in the electrolytic cell.

The seal/tentering member of the present invention should exhibit a high degree of resistance to corrosion by a variety of different electrolytes and products of electrolysis. However, the seal/tentering member should show particular resistance to corrosion when the electrolyte which is electrolyzed is an aqueous solution of an alkali metal chloride, for example, an aqueous solution of sodium chloride. An aqueous solution of alkali metal chloride may be electrolyzed in a cell which comprises a separator between each anode and adjacent cathode. The seal/tentering member should be resistant to wet chlorine produced during operation of such a cell.

The seal/tentering member is suitably made of an organic polymeric material which material may be, for example, a polyolefin e.g. polyethylene or polypropylene; a hydrocarbon elastomer, e.g. an elastomer based on ethylene-propylene copolymer, an ethyelene-propylene-diene copolymer, natural rubber or a styrene-butadiene rubber; or a chlorinated hydrocarbon, e.g. polyvinyl chloride or polyvinylidene chloride. It is particularly desirable that the material of the seal/tentering member be chemically resistant to the liquors in the electrolytic cell, and when the cell is to be used in the electrolysis of aqueous alkali metal chloride solution the material may be fluorinated polymeric material, for example polytetrafluoroethylene, polyvinyl fluoride, polyvinylidene fluoride, fluorinated ethylene-propylene copolymer; tetra-fluoroethylene-hexafluoropropyl copolymer, or a substrate having an outer layer of such a fluorinated polymeric material.

Elastomeric solids are suitable for use as the seal/tentering member. Examples of the include chlorobutadiene rubber (neoprene), chlorosulfonated polyethylene (Hypalon ®), ethylene-propylene dimonomer (EPDM), or gum rubber.

The hardness of the seal/tentering member is not critical and any suitable hardness may be selected for the seal/tentering member. Preferably, the seal/tentering member has a low degree of hardness which allows the seal/tentering members to fill in irregularities on the frame members and thus permit reduced tolerances which minimizes, for example, machining of metal frame and thus reduces production costs. For example, the elastomeric seal/tentering member having a hardness of about 50 durometer to about 90 durometer are suitable.

The thickness of the seal/tentering member is also not critical, but a suitable thickness should be selected for ease of manufacture of the seal/tentering member used. For example, the thickness of the elastomeric seal/tentering member may be from 1.5 mm to about 5 mm.

The seal/tentering member of the present invention may be used in any suitable filter press type cell, the structure and function of its central components being well known to one of skill in the art. The electrolytic cell may be of the filter press type comprising any number of the alternating anodes and cathodes. Electrolytic cells of the aforementioned types are used on a large scale for the production of chlorine and caustic alkali.

Preferred filter press electrolytic cells for employing the present invention are bipolar or monopolar membrane cells in which the electrodes are oriented generally vertically. Suitable bipolar filter press membrane electrolytic cell in which the seal/tentering member may be used include, for example, those described in U.S. Pat. No. 4,488,946. Suitable filter press monopolar membrane electrolytic cells include those described in U.S. Pat. No. 4,056,458, issued Nov. 1, 1977, to G. R. Pohto et al.; U.S. Pat. No. 4,210,516, issued July 1, 1980, to L. Mose et al. and U.S. Pat. No. 4,217,199, issued Aug. 12, 1980, to H. Cunningham.

The electrolytic cell comprises an anode or a plurality of anodes and a cathode or a plurality of cathodes, and one or more seal/tentering members of the present invention compressed together with a separator between each anode and adjacent cathode which divides the cell into separate anode and cathode compartments.

The electrolytic cell is equipped with means for charging electrolyte to the cell and with means for removing the products of electrolysis from the cell. In particular, the anode compartments of the cell are provided with means for feeding aqueous alkali metal chloride electrolyte to the cell, suitable from a common header, and with means for removing products of electrolysis form the cell. Similarly, the cathode compartments of the cell are provided with means for removing products of electrolysis from the cell, and optionally with means for feeding water or other fluid to the cell. The electrolysis process may be operated by charging electrolyte to the electrolytic cell, electrolyzing the electrolyte therein, and removing the products of electrolysis from the electrolytic cell.

The separator may be a hydraulically permeable diaphragm or a substantially hydraulically impermeable ionically-permselective membrane.

In the electrolytic cell equipped with a hydraulically-permeable microporous diaphragm and where an aqueous alkali metal chloride solution is electrolyzed in such a cell the solution is charged to the anode compartments of the cell and chlorine produced during electrolysis is removed therefrom, the solution passes through the diaphragm to the cathode compartments of the cell and hydrogen and aqueous alkali metal hydroxide solution produced by electrolysis are removed therefrom.

In an electrolytic cell equipped with an essentially hydraulically impermeable cationically-permselective membrane, aqueous alkali metal chloride solution is charged to the anode compartments of the cell and chlorine produced during electrolysis and depleted alkali metal chloride solution are removed from the anode compartments, alkali metal ions are transported across the membranes to the cathode compartments of the cell to which water or dilute alkali metal hydroxide solution may be charged, and hydrogen and alkali metal hydroxide solution produced by the reaction of alkali metal ions with hydroxyl ions are removed from the cathode compartments of the cell.

Preferably, inert flexible separators having ion exchange properties and which are substantially impervious to the hydrodynamic flow of the electrolyte and the passage of gas products produced in the cell are employed. Suitably used are cation exchange membranes such as those composed of fluorocarbon polymers having a plurality of pendant sulfonic acid groups or carboxylic acid groups or mixtures of sulfonic acid groups and carboxylic acid groups. The terms "sulfonic acid groups" and "carboxylic acid groups" are meant to include salts of sulfonic acid or salts of carboxylic acid which are suitably converted to or from the acid groups by processes such as hydrolysis. One example of a suitable membrane material having cation exchange properties is a perfluorosulfonic acid resin membrane composed of a copolymer of a polyfluoroolefin with a sulfonated perfluorovinyl ether. A composite membrane sold commercially by E. I. duPont de Nemours and Company under the trademark Nafion ® is a suitable example of this membrane.

Another example of a suitable membrane is a cation exchange membrane using a carboxylic acid group as the ion exchange group. Carboxylic acid type cation exchange membranes are available commercially from the Asahi Glass Company under the trademark Flemion ®.

The electrodes have frame members such as 21 and 22 which have generally planar opposing surfaces, such as surfaces 23 and 24, between which the seal/tentering member 10 is compressed. The frames are generally of a thick solid construction capable of withstanding the considerable compression force exerted upon the frames when the filter press cell is assembled. To prevent the seal/tentering member from "popping out" under compression, the frames should be substantially flat. To avoid the considerable expense of machining and finishing, the opposing planar surfaces are free of recesses or grooves. However, such recesses or grooves can be incorporated in the frame flange portions 23 and 24 as described above, if so desired.

Electrode frame components may be in the shape of rectangular bars, C or U channels, cylindrical tubes, elliptical tubes as well as being I-shaped or H-shaped. Preferably, the frame components are in the shape of an I-shaped cross section as shown in FIG. 1.

The materials of construction for frame components may be any which are resistant to corrosion by the electrolytes and the products of electrolysis. For example, metal anode frames used in the electrolysis of alkali metal chlorides are constructed of valve metals such as titanium, tantalum, or tungsten and their alloys, with titanium being preferred. Cathode frames may be constructed of metals such as iron, steel, stainless steel, nickel, or their alloys, with nickel being preferred. In addition, plastic materials such as polypropylene, polybutylene, polytetrafluoroethylene, FEP, and chlorendic acid based polyesters may be used for the construction of the frame components.

During assembly of the filter press electrolytic cell, pressing means such as tie bolts tightened around the perimeter of the cell or hydraulic cylinders pressing against a mobile platen against the cell frame members is used. The pressing means holds the individual electrodes, anodes, and cathodes alternately arranged, together. An adjacent electrode pair, a cathode and an anode, are compressed together so that the seal/tentering member is compressed. The electrodes are separated by the individual seal/tentering members which is inserted therebetween which contains the separator attached to the flange portion of the seal/tentering member. As the electrodes are compressed together by the application of a suitable closure force, the seal/tentering member deforms in a manner which effects a fluid and gas-tight seal between adjacent electrode frames, as well as securely holding the separator on the flange portion towards the inside of the electrolytic cell assembly.

What is claimed is:

1. A seal and tentering assembly for an electrolysis cell comprising:
   (a) a seal and tentering member including
      (i) a first sealing portion having a primary surface adopted for contacting at least two adjacent electrolysis frame members and providing a fluid-tight seal between the two adjacent frame members against fluid leakage; and
      (ii) a second flange portion integral with the first portion; the second portion having a secondary surface adapted for providing a mating surface for engageably securing a means for releasably fastening a membrane member thereto; and
   (b) a means for removably fastening at least the peripheral edge of a membrane member to the second flange portion, said fastening means providing a fluid-tight seal around the peripheral edge of said membrane and adopted for sealing the edge of the membrane from fluid leakage.

2. An electrolysis cell assembly comprising:
   (a) at least two adjacent cell frame members;
   (b) a separator interposed between the cell frame members; and
   (c) a seal and tentering assembly of claim 1 interposed between said cell frame members.

3. The assembly of claim 1 wherein the first sealing portion is adapted for sealing against the electrolysis cells' internal pressure leakage.

4. The assembly of claim 1 wherein the second flange portion is adapted for sealing against the differential pressure of the electrolysis cells' compartment leakage.

5. The assembly of claim 1 wherein the sealing and tentering member has a perimeter which is "P-shaped" in configuration when viewed in a cross section.

6. The assembly of claim 1 wherein the sealing and tentering member includes a flange portion integral with said first portion extending a predetermined length over the outer peripheral surface of at least one electrolysis cell frame member.

7. The assembly of claim 1 including a mean for fastening the seal and tentering member to at least one electrolysis cell frame members.

8. A combination sealing means and tentering means for a filter press type electrolytic cell comprising:
   a solid body structure in a picture frame type configuration comprising a first generally rectangular portion integral with a second generally rectangular flange portion of a size smaller than the first portion forming a "P-shaped" member when viewed in cross section, said first portion adapted for providing a seal between two planar frame members, said second flange portion adapted for tentering a separator member thereon, the first portion generally rectangular in cross section, having parallel top and bottom walls and first and second vertical parallel side walls, and a second flange portion integral with the first portion generally rectangular in cross section having a top and bottom wall and first and second parallel side walls, said second portion having top and bottom walls of a smaller length to form a "P-shaped" parameter viewed in cross section, said bottom of first portion and top of second portion being a contiguous boundary and said first side wall of said second portion and said first side wall of said first portion is substantially the same wall, the second sidewall of the second portion adapted for tentering a separator.

9. The sealing and tentering means of claim 8 including a means for removably fastening a membrane member to the second sidewall of said second portion.

10. The sealing and tentering means of claim 8 including a recess portion in said first side wall of first portion adapted for receiving at least one O-ring type member.

11. A cell assembly comprising at least two frame members, a separator and a sealing and tentering means of claim 8.

12. A method of sealing an electrolytic cell comprising:
   (a) providing a seal/tentering member including a solid body structure in a picture frame type configuration comprising a first generally rectangular portion integral with a second generally rectangular flange portion of a size smaller than the first portion forming a "P-shaped" member when viewed in cross section, said first portion adapted for providing a seal between two planar frame members, said second flange portion adapted for tentering a separator member thereon, the first portion generally rectangular in cross section, having parallel top and bottom walls and first and second vertical parallel side walls, and a second flange portion integral with the first portion generally rectangular in cross section having a top and bottom wall and first and second parallel side walls, said second portion having top and bottom walls of a smaller length to form a "P-shaped"

parameter viewed in cross section, said bottom of first portion and top of second portion being a contiguous boundary and said first side wall of said second portion and said first side wall of said first portion is substantially the same wall, the second sidewall of the second portion adapted for tentering a separator;

(b) attaching a sheet-like separator in the second sidewall of the second portion of the seal/tentering member;

(c) interposing the seal/tentering member with separator between at least a first frame member and a second frame member, the separator spacing apart an anode and a cathode compartments defined by the first and second frame members and the separator; and (d) compressing the seal/tentering member with separator and the first and second frame members together.

13. A method of operating an electrolytic cell comprising:

(a) providing a seal/tentering member including a solid body structure in a picture frame type configuration comprising a first generally rectangular portion integral with a second generally rectangular flange portion of a size smaller than the first portion forming a "P-shaped" member when viewed in cross section, said first portion adapted for providing a seal between two planar frame members, said second flange portion adapted for tentering a separator member thereon, the first portion generally rectangular in cross section, having parallel top and bottom walls and first and second vertical parallel side walls, and a second flange portion integral with the first portion generally rectangular in cross section having a top and bottom wall and first and second parallel side walls, said second portion having top and bottom walls of a smaller length to form a "P-shaped" parameter viewed in cross section, said bottom of first portion and top of second portion being a contiguous boundary and said first side wall of said second portion and said first side wall of said first portion is substantially the same wall, the second sidewall of the second portion adapted for tentering a separator;

(b) attaching a sheet-like separator in the second sidewall of the second portion of the seal/tentering member;

(c) interposing the seal/tentering member with separator between at least a first frame member and a second frame member, the separator spacing apart an anode and a cathode compartments defined by the first and second frame members and the separator;

(d) compressing the seal/tentering member with separator and the first and second frame members together;

(e) feeding an aqueous alkali metal halide solution to the electrolytic cell; and (f) passing an electrical current from the anode to the cathode such that a halide is evolved at the anode.

* * * * *